(12) United States Patent
Qiu et al.

(10) Patent No.: US 11,666,065 B2
(45) Date of Patent: Jun. 6, 2023

(54) ENHANCED FLAVOR RELEASE CHEWING GUM COMPOSITION

(71) Applicant: ROQUETTE FRERES, Lestrem (FR)

(72) Inventors: Rong Qiu, Quzhou (CN); Qingli Wang, Shanghai (CN)

(73) Assignee: ROQUETTE FRERES, Lestrem (FR)

( * ) Notice: Subject to any disclaimer, the term of this patent is extended or adjusted under 35 U.S.C. 154(b) by 0 days.

(21) Appl. No.: 15/998,925

(22) PCT Filed: Feb. 16, 2017

(86) PCT No.: PCT/EP2017/053473
§ 371 (c)(1),
(2) Date: Aug. 17, 2018

(87) PCT Pub. No.: WO2017/140761
PCT Pub. Date: Aug. 24, 2017

(65) Prior Publication Data
US 2019/0246662 A1    Aug. 15, 2019

(30) Foreign Application Priority Data
Feb. 17, 2016 (CN) .......................... 201610090340.7

(51) Int. Cl.
A23G 4/10 (2006.01)
A23G 4/06 (2006.01)
A23G 4/08 (2006.01)

(52) U.S. Cl.
CPC .................. *A23G 4/10* (2013.01); *A23G 4/06* (2013.01); *A23G 4/08* (2013.01); *A23V 2002/00* (2013.01); *A23V 2200/15* (2013.01); *A23V 2250/6416* (2013.01); *A23V 2300/31* (2013.01)

(58) Field of Classification Search
None
See application file for complete search history.

(56) References Cited

U.S. PATENT DOCUMENTS

| | | | |
|---|---|---|---|
| 3,920,849 A | 11/1975 | Marmo et al. | |
| 4,001,438 A | 1/1977 | Marmo et al. | |
| 4,803,082 A * | 2/1989 | Cherukuri | A23G 4/20 424/493 |
| 4,959,225 A * | 9/1990 | Wong | A23G 3/346 426/3 |
| 5,156,866 A * | 10/1992 | Sato | A23G 4/06 426/5 |
| 5,370,881 A * | 12/1994 | Fuisz | A61K 8/735 426/549 |
| 5,547,689 A | 8/1996 | Ribadeau-Dumas et al. | |
| 5,637,334 A | 6/1997 | Yatka et al. | |
| 5,679,389 A | 10/1997 | Wong et al. | |
| 6,458,401 B1 * | 10/2002 | Beauregard | A21D 2/181 426/549 |
| 2009/0163700 A1 * | 6/2009 | Boit | A23G 4/10 536/4.1 |
| 2013/0177668 A1 * | 7/2013 | Fuchs | A23G 3/346 426/3 |

FOREIGN PATENT DOCUMENTS

| | | |
|---|---|---|
| EP | 0 122 808 A2 | 10/1984 |
| WO | 2015/028763 A1 | 3/2015 |

OTHER PUBLICATIONS

May 3, 2017 International Search Report issued in International Patent Application PCT/EP2017/053473.

* cited by examiner

*Primary Examiner* — Nikki H. Dees
(74) *Attorney, Agent, or Firm* — Oliff PLC

(57) ABSTRACT

A chewing gum composition and more particularly to a chewing gum composition has enhanced flavor release.

5 Claims, No Drawings

ENHANCED FLAVOR RELEASE CHEWING GUM COMPOSITION

INTRODUCTION

The present invention relates to a chewing gum composition and more particularly to a chewing gum composition having an enhanced flavor release system. More specifically, the present invention relates to a flavor-releasing formulation containing a polyol powder with a particular specific surface area enabling a prolonged flavor release.

Chewing gum compositions generally contain a water-insoluble gum base, a flavoring that may be added in a variety of forms, and water-soluble sweeteners that are either natural or artificial. Also, to improve consistency and to generally enhance the chewing experience, the gum may contain various additives such as plasticizers, softeners, bulking agents . . . .

Although chewing gums have been commonly found on the market for decades, several deficiencies are still commonly observed:
 a relatively rapid exhaustion of the flavor and sweetness sensation during chewing.
 limited shelf stability of the flavors stored for a period of time between manufacture and consumption.

To counter this unwanted behavior, several solutions in the art have been proposed, such as chewing gum formulations comprising spherical particle having microporous channels (U.S. Pat. No. 4,497,832) or porous flavor reservoir material (WO2008055006), which however are either cumbersome and/or not cost effective to be worked into practice.

U.S. Pat. No. 3,920,849 and U.S. Pat. No. 4,001,438 to Marmo et al addresses the concept of extended flavor release and offers a full discussion of the prior art on this subject. The patent directs itself to the preparation of separate flavor components identified as "fixed" (encapsulated) and "unfixed", which are mixed with a suspension agent such as silica, xanthan gum and ethyl cellulose prior to their addition to a chewing gum base. The patentees contend that this method of preparation and addition to the chewing gum offers improved flavor intensity and uniform flavor transmission. The patentees specifically employ a non-confined hydrophobic flavor oil and a "fixed" hydrolytically releasable flavor oil in combination with a solid suspending agent, as their flavor system. The preparation of the flavors is such that the resulting flavor system is added simultaneously to the gum base.

In contrast to the Marmo et al. technique, U.S. Pat. No. 3,826,847 to Ogawa et al. relates to encapsulation of flavoring oils with polyvinyl acetates, that is high molecular weight material. The encapsulated oil is thereafter incorporated into a chewing gum base. Ogawa et al purport to achieve sequential flavor delivery by the modulation of the coating applied to the respective flavor particles.

Therefore, common gums, or more cost effective gums, containing a flavoring agent will exhibit a very strong rapid flavor release in the beginning periods of chewing. After this initial flavor release, the flavor release dramatically decreases.

It is thus still desirable to develop chewing gums and bubble gums having extended flavor.

The alternative formulation embodying the present invention enables a simple, cost effective and yet significant flavor release during the later periods of chewing.

SUMMARY OF THE INVENTION

The subject matter of the present invention concerns a method for preparing a chewing gum composition having flavor enhanced release, comprising the following successive steps:
 (a) preparing a premix comprising at least one flavoring agent and at least one polyol powder comprising or consisting in maltitol wherein the specific surface area of the polyol powder is superior to 0.5 m$^2$/g, such as comprised between 0.55 to 0.95 m$^2$/g, more advantageously about 0.8 m$^2$/g and
 (b) mixing said premix with a gum base.

Therefore the subject matter of the present invention concerns a chewing gum composition comprising:
 a chewing gum base;
 at least one polyol powder comprising or consisting in maltitol wherein the specific surface area of the polyol powder is superior to 0.5 m$^2$, such as comprised between 0.55 to 0.95 m$^2$/g, more advantageously about 0.8 m$^2$/g;
 at least one flavor;
characterized in that at least one flavor is adsorbed on the polyol powder.

Moreover, the subject matter of the present invention concerns a chewing gum composition obtainable by the process disclosed herein.

DEFINITIONS

"Specific Surface Area"

In the context of the present invention, specific surface area is the total surface area (square meter; m$^2$) of a material (powder in this case) per unit of mass (gram; g). The measurement of the specific surface area in the context of the present invention can be made by Brunauer-Emmett-Teller (N$_2$-BET) adsorption method.

"Chewing Gum"

In the context of this invention, "chewing gum" refers to chewing gum, bubble gum and the like. Moreover, all percentages are based on weight percentages unless otherwise specified. Molecular weights specified are weight average molecular weights.

In general, a chewing gum composition typically comprises a water soluble bulk portion added to the water insoluble chewable gum base portion.

The flavoring agents are typically water insoluble.

The water soluble portion dissipates with a portion of the flavoring agent over a period of time during chewing, while the gum base portion is retained in the mouth throughout the chew. The water soluble portion of the chewing gum may further comprise softeners, sweeteners, flavoring agents and combinations thereof.

A variety of traditional ingredients such as plasticizers or softeners including lanolin, stearic acid, sodium stearate, potassium stearate, glyceryl triacetate, glycerine and the like for example, natural waxes, petroleum waxes, such as polyethylene waxes, paraffin waxes and microcrystalline waxes may also be incorporated into the gum base to obtain a variety of desirable textures and consistency properties. In the present invention, these individual additional materials can generally be employed in amounts of up to about 30% by weight and preferably in amounts of from about 0 to about 20%, more preferably 1.5% to about 20% by weight of the final gum base composition.

Optional ingredients such as antioxidants, coloring agents may be added to the chewing gum.

"Gum Base"

The gum base portion is usually retained in the mouth throughout the chew and thus is not (or extremely slightly) water soluble. Chewing gum bases generally comprise a combination of elastomers and resins together with plasticizers and inorganic fillers. The gum base may contain natural gums and/or synthetic elastomers and resins. Natural gums include both elastomers and resins.

The gum base used may be any water-insoluble gum base well known in the art. Illustrative examples of suitable polymers in gum bases include both natural and synthetic elastomers and rubbers. For example, those polymers which are suitable in gum bases, include, without limitation, substances of vegetable origin such as chicle, jelutong, gutta percha and crown gum. Synthetic elastomers such as butadiene-styrene copolymers, isobutylene-isoprene copolymers, polyethylene, polyisobutylene and polyvinylacetate and mixtures thereof, are particularly useful.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight of the gum base.

Suitable natural gums include, but are not limited to chicle, jellutong, sorva, nispero tunu, niger gutta, massaranduba belata, and chiquibul. When no natural gums are used, the gum base is referred to as "synthetic" and the natural gums are replaced with synthetic elastomers and resins. Synthetic elastomers may include polyisoprene, polyisobutylene, isobutylene-isoprene copolymer, styrene butadiene rubber, and the like. The amount of elastomer used in the gum base can typically be varied between about 10 and about 20 percent depending on the specific elastomer selected and on the physical properties desired in the final gum base. For example, the viscosity, softening point, and elasticity can be varied. Resins used in gum bases may include polyvinyl acetate, polyethylene, ester gums, (resin esters of glycerol), polyvinyl acetate polyethylene copolymers, polyvinyl acetate polyvinyl laureate copolymers, and polyterpenes. Additionally, polyvinyl acetate and polyterpene may be used. As with the elastomer, the amount of resin used in the gum base can be varied depending on the particular resin selected and on the physical properties desired in the final gum base. With regard to the chewing gum formulation in particular, the amount of gum base employed will vary greatly depending on various factors such as the type of base used, consistency desired and other components used to make the final product.

Typically, in the present invention the gum base constitutes between about 5 to about 95% by weight of the gum. More preferably the insoluble gum base comprises between 10 and 50% by weight of the gum and most preferably about 20 to about 35% by weight of the gum. In general, in the present invention amounts of about 5% to about 45% by weight of the final chewing gum composition are acceptable for use in chewing gum compositions with preferred amounts of about 15% to about 40% by weight.

"Coating"

A coating of the chewing gums once shaped is possible and increases even more the shelf life of the flavor releasing formulation. Generally, any natural or synthetic material that exhibits a flavor barrier characteristic can be used for the coating. Inert materials and hydrophilic materials are preferred for the coating. For example, the coating can be: polymers and waxes, hydrophilic materials such as sugar, gelatins, gum Arabic, alginates, chitosan, corn syrup, starch, cellulose (methyl-cellulose), carrageenan, polyvinyl prolidone, polyvinyl alcohol, and ethylene vinyl alcohol copolymers, polyvinyl acetates; and polyethylene. When choosing waxes as coatings, the higher melting point waxes exhibit superior flavor barrier characteristics to lower melting point waxes. Generally, any paraffin based wax with a melting point range of about 50° C.-100° C. can be useful as a coating. The coating can be added by a rotating disk coater, by a fluidized bed coater, spray chilling or by a tumbler.

"Flavours"/"Flavouring Agents"

Flavouring agents well known to the chewing gum art may be added to the chewing gum compositions of the instant invention. Flavoring agents may comprise essential oils, synthetic flavors, or mixture thereof including but not limited to oils derived from plants and fruits such as citrus oils, fruit essences, peppermint oil, spearmint oil, clove oil, oil of wintergreen, anise, and the like.

Artificial flavoring agents are also contemplated.

Those skilled in the art will recognize that natural and artificial flavoring agents may be combined in any sensorially acceptable blend.

"Bulking Agent"

Typically in the art, the water-soluble portion of the chewing gum is comprised of water-soluble bulking agent, such as sucrose. Indeed, consumers require a certain amount of mass to remain in the mouth during mastication of chewing gum to realize that pleasure of chewing. The mass must be at least in part elastic, that is, it must deform and reform with resistance during mastication. To have that elastic character, the mass must have the ability to be cohesive that is to remain in mostly a single mass under the mechanical exertion of mastication. Whereas the water-soluble portion slowly dissolves during chewing and is swallowed, the water-insoluble portion does not dissolve during chewing and is removed from the mouth when mastication is complete. Traditionally, sucrose was used as the water-soluble bulking agent for chewing gums. Sucrose typically gives volume to a chewing gum mass and slowly dissolves during chewing, which slowly releases sweetness and enhances flavor delivery of the chewing gum. In the context of the present invention, the polyol powder comprising or consisting in maltitol with a specific surface area superior to 0.5 $m^2/g$ used for the preparation of the premix will be considered as a bulking agent as it is released whilst chewing and enables to exhibit flavor(s).

"Sweetener"

The term sweetening agents or sweeteners as used herein refer broadly to water-soluble sweetening agents.

The chewing gum compositions employing the instant gum bases may be sugar-containing formulations or sugar-free formulation (i.e. non-cariogenic formulation). Without being limited to particular sweeteners representative illustrations of water-soluble sweetening agents include materials such as saccharides (monosaccharides, disaccharides, and polysaccharides) such as xylose, ribose, glucose, mannose, galactose, fructose, levulose, dextrose, dextrin, dried invert sugar, sucrose, sugar, maltose, partially hydrolyzed starch or corn syrup solids and sugar alcohols such as sorbitol, xylitol, maltitol, mannitol and mixtures thereof.

In the present invention the polyol powder comprising or consisting in maltitol with a specific surface area superior to 0.5 m$^2$/g used for the preparation of the premix will also be considered as a sweetener. In a preferred embodiment of the present invention the polyol powder comprising or consisting in maltitol with a specific surface area superior to 0.5 m$^2$/g used for the preparation of the premix is the only polyol, the only sweetener of the chewing-gum composition.

According to a preferred embodiment of the present invention the polyol powder useful for the preparation of the premix is a polyol powder consisting in maltitol with a specific surface area superior to 0.5 m$^2$/g, preferably 0.55 to 0.95 m$^2$/g, and more preferably about 0.8 m$^2$/g.

"Softeners"

Softeners are added to the chewing gum in order to optimize the chewability and mouth feel of the gum. Softeners, also known in the art as plasticizers or plasticizing agents, generally constitute between about 0 to 30%, preferably 0.5 to about 15.0 percent by weight of the chewing gum. Softeners contemplated by the present invention include glycerin, lecithin, and combinations thereof. Further, aqueous sweetener solutions such as those containing sorbitol, hydrogenated starch hydrolysates, corn syrup and combinations thereof may be used as softeners and binding agents in the chewing gum. The syrups sold by Roquette under trade name Lycasin® are an example of softeners that can be used advantageously in the present invention.

"Plasticizer"

A material optionally used is a plasticizer, which aids in the processing of the other materials.

The gum base may include plasticizers selected from the group consisting of fats, oils, waxes, and mixtures thereof. The fats and oils can include tallow, hydrogenated and partially hydrogenated vegetable oils, and cocoa butter. Commonly employed waxes include paraffin, microcrystalline and natural waxes such as beeswax and carnauba. Additionally, mixtures of the plasticizers may be used such as a mixture of paraffin wax, partially hydrogenated vegetable oil, and glycerol monostearate.

"Filler"

The gum base may include a filler component. The filler component may be selected from the group consisting of calcium carbonate, magnesium carbonate, talc, dicalcium phosphate and the like. The filler may constitute between about 5 to about 60 percent by weight of the gum base. Preferably, the filler comprises about 5 to about 50 percent by weight of the gum base.

"Optional Additives"

The chewing gum composition of this invention may additionally include the conventional additives of coloring agents such as titanium dioxide; and additional fillers such as aluminium hydroxide, alumina, aluminium silicates, calcium carbonate, and talc and combinations thereof. These fillers may also be used in the gum base in various amounts. Preferably the amount of coloring agents when used will vary from about 1% to about 5% by weight of the final chewing gum.

"Adsorbed"

In the context of the present invention, the term "adsorbed" means to undergo or cause to undergo a process in which a substance, e.g. a flavor in the context of the present invention, accumulates on the surface of a solid, i.e. powder particles specifically maltitol powder particles.

Preferably, the adsorption of the substance is obtained by a specific step in the process of manufacture of the chewing gum of the present invention, i.e. in the premix formation step.

"About"

In the context of this invention, about refers to a variation of the value it is linked to by more or less 10%.

DETAILED DESCRIPTION

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Advantageously, the subject matter of the present invention more specifically concerns a method for preparing a chewing gum composition as disclosed herein characterized in that the proportion of the at least one polyol powder comprising or consisting in maltitol is comprised between 25 and 75% in weight in comparison to the total weight of the chewing gum composition.

Advantageously, the subject matter of the present invention concerns a method for preparing a chewing gum composition as disclosed herein characterized in that the at least one polyol powder comprising or consisting in maltitol has a mean particle diameter comprised between 100 and 1000 μm, preferably between 110 and 500 μm, more preferably between 120 and 180 μm.

Advantageously, the subject matter of the present invention concerns a method for preparing a chewing gum composition as disclosed herein characterized in that the polyol powder comprising or consisting in maltitol was obtained by wet granulation.

Advantageously, the subject matter of the present invention concerns a method for preparing a chewing gum composition as disclosed herein characterized in that the polyol powder comprising or consisting in maltitol is in the form of an agglomerate, a granulate or more precisely in the form of a coated granule.

The polyol powder comprising or consisting in maltitol, preferably consisting in maltitol is preferably obtained by the process according to U.S. Pat. No. 6,458,401.

More precisely the polyol powder comprising or consisting in maltitol is obtained by a process that does not involve formation of massecuite, neither application of a shear force or kneading, instead just relying on concurrent coating, agglomeration and induction of crystallization by allowing the agglomerated mixture mature at a temperature below the melting pint of the maltitol to form solid granules.

In a preferred embodiment of the present invention the polyol powder consisting in maltitol may be obtained by continuously mixing maltitol syrup having a dry matter content of at least 70% by weight and a maltitol content of at least 85% by weight on a dry matter basis, the mixing being effected by simultaneously dispersing the maltitol syrup and maltitol containing seeds into an open rotating receptacle containing maltitol based granules whereby the maltitol syrup and maltitol containing seeds are mixed at the surface of the maltitol based granules contained in the receptacle, collecting maltitol based granules from the receptacle and crystallizing maltitol contained in said granules, the maltitol based granules in the receptacle being maintained in motion by the rotation of the receptacle.

Examples of polyol powder consisting in maltitol useful for the present invention include Sweet Pearl® SP150FD sold by Roquette.

As stated above, all flavors and flavor blends (such as oils or oil blends) contemplated by the present invention, include by way of example, peppermint, spearmint, wintergreen (methylsalicylate), orange, blueberry, grape, strawberry, pineapple, raspberry, lime, lemon, cherry, apple, pear, peach, plum, cola, licorice, cinnamon, menthol, clove, nut, vanilla, anise, bay, eucalyptus and citrus including lemon, orange, grape, lime and grapefruit. In addition, sensates, such as cooling agents, warming agents and tingling agents, may be added with the flavor.

The amount of flavoring agent employed is normally a matter of preference subject to such factors as flavor type, base type and strength desired. In general, amounts of about 0.05% to about 6% by weight of the final chewing gum composition are usable with amounts of about 0.3% to about 1.5% being preferred and about 0.5% to about 1.2% being most preferred. Furthermore in accordance to the present invention the amount of flavoring agent is about 5 to 35% in weight in comparison to the total weight of the premix (maltitol+flavouring agent).

Advantageously, the subject matter of the present invention concerns a method for preparing a chewing gum composition as disclosed herein characterized in that the amount of the at least one flavor is between 0.05 to 6% in weight in comparison to the total weight of the chewing gum composition, preferably 0.3 to 1.5% in weight.

Advantageously, the subject matter of the present invention concerns a method for preparing a chewing gum composition as disclosed herein characterized in that the at least one flavor is liquid before preparing the premix of step (a).

Indeed, the flavoring agent is preferably employed in its liquid oil form in order to achieve maximum sorption within the polyol powder comprising or consisting in maltitol. Upon mixing the flavoring liquid and the polyol powder, the flavoring liquid is entrapped within the polyol powder, and a delay in flavor releases has been witnessed.

The products have preferred low bulk densities in the range of about 0.5-0.8 g/ml, preferably about 0.6-0.7 g/ml.

The following examples are given to illustrate the invention, but are not deemed to be limiting thereof. All percentages given throughout the specification are based upon weight unless otherwise indicated.

Generally in the art, chewing gum is manufactured by sequentially adding the various chewing gum ingredients to a commercially available mixer known in the art. A mixer with a chopper may be preferred if the chopper is needed to break up pieces that start to agglomerate together during mixing. After the ingredients have been thoroughly mixed, the gum mass is discharged from the mixer and shaped into the desired form such as by rolling into sheets and cutting into sticks, extruding into chunks or casting into pellets. The method of producing the chewing gum according to the present invention differs from this by the formation of a premix comprising at least one flavoring agent and at least one polyol powder (comprising or consisting in maltitol) with specific surface area (see above). Then this premix is added to a gum base.

Generally in the art, the ingredients are mixed by first melting the gum base and adding it to the running mixer. The base may also be melted in the mixer itself. This also applies to the present invention, should the gum base be melted. Coloring agents may also be added at this time. A softener such as glycerin or glucose syrup may also be added at this time.

The entire mixing procedure according to the present invention typically takes about fifteen minutes to half an hour, but longer mixing times may sometimes be required. Those skilled in the art will recognize that many variations of the above-described procedure may be followed, so long a premix is made and added to the gum.

Therefore, these ingredients of the gum base can be combined in a conventional manner. A further step of grinding may be added is required. Grinding can be accomplished by means known to the art. On large scale operations, where heat build may become a concern, cryogenic grinding can be used. Environmental exposure of the extrudate to high humidity before or after grinding may reduce the cores ability to hold flavoring agent and may increase handling difficulties.

In particular, the elastomer, resins, plasticizers, and the filler are typically softened by heating and then mixed for a time sufficient to insure a homogenous mass.

The mass can be formed into slabs or pellets and allowed to cool before use in making chewing gum. Alternatively, the molten mass can be used directly in a chewing gum making process.

The premix of polyol powder of the present invention may be incorporated into an otherwise conventional chewing gum formulation using standard techniques and equipment known to those skilled in the art. In a typical embodiment the chewing gum base is blended with a plasticizer together with the optional additives such as fillers and coloring agents under heat to plasticize the blend as well as to modulate the hardness, viscoelasticity and formability of the base. The heating temperature may vary widely but is for practical purposes preferably around 70° C. to 120° C., more preferably around 50° C. to 80° C. The chewing gum base is then blended with the premix of polyol powder of the present invention. Once blending is achieved the chewing gum formulation is removed and formed into any suitable shape.

More preferably, the gums can be prepared by first melting the gum base at a temperature from 70° C. to 120° C., more preferably around 50° C. to 80° C. and mixing the gum base in a kneader with the liquid softener (for instance corn syrup such Lycasin® 85/15 sold by Roquette). Mixing is continued for several minutes. To this mixture the premix of polyol powder of the present invention is then added and mixed for several minutes. Mixing is continued for few minutes at which time humectant can be added. The gum is discharged from the kneader and formed into its final shape such as strips, slabs, chunks, balls, ropes. It also can be center filled.

The premix of the polyol powder of the present invention may be added in several portions to the gum base. This can be made by splitting in two relatively equal masses (50% more or less 10%) the premix mass and adding and mixing the first half to the gum base. Then once the premix is incorporated into the gum base, (e.g. few minutes depending on the quantities implied), the second half of premix can be added and mixed. In this preferred embodiment, the liquid softener is added after the first half of premix. Such order of addition of the ingredients enables to get a much more homogeneous composition.

The process according to the present invention enables to get a chewing gum composition with an extended flavor. Contrary to the different solutions of the prior art the process according to the present invention does not require the addition of a further ingredient.

Another object of the present invention is directed to a chewing gum composition comprising one flavoring agent adsorbed on a polyol powder comprising or consisting in maltitol wherein the specific surface area of the polyol powder is superior to 0.5 m².

Thus the present invention also relates to a chewing gum composition comprising:
- a chewing gum base;
- at least one polyol powder comprising or consisting in maltitol wherein the specific surface area of the polyol powder is superior to 0.5 m²;
- at least one flavoring agent;

characterized in that at least one flavoring agent is adsorbed on the polyol powder.

All the features (individually or in combination) described above for the process of course apply to the chewing gum composition. In particular the polyol powder comprising or consisting in maltitol wherein the specific surface area of the polyol powder is preferably between 0.55 to 0.95 m²/g, more advantageously about 0.8 m²/g. more preferably the polyol powder consists in maltitol and said polyol powder is obtained by wet granulation and is in the form of a coated granule.

The chewing gum composition according to the present invention enables to get chewing gum with an extended flavor release.

EXAMPLES

The following examples are given to illustrate the invention, but are not deemed to be limiting thereof. All percentages given throughout the specification are based upon weight unless otherwise indicated.

For the disclosed examples, the following compounds were used:

Example 1

Flavor Release Impact by Polyols (SP90 and SP150FD)

1. Aim

The aim was to compare the effect of the ingredients (SP90 and SP150FD) and of the process on the flavor release.

2. Recipe and Processing Method

Formulation

TABLE 2

Polyols/flavor powder (Premix):

| Ingredients | R1 SP90/Flavor | R2 SP150FD/Flavor |
|---|---|---|
| SweetPearl ®P90 | 983.00 g | — |
| SweetPearl ®P150FD | — | 983.00 g |
| Flavor mint/vanilla | 17.00 g | 17.00 g |
| Total | 1000.00 g | 1000.00 g |

TABLE 3

Chewing gum center* formulations:

| Ingredients | T1 CG center with SP90 | T2 CG center with SP90/ Flavor | T3 CG center with SP150FD | T4 CG center with SP150FD/ Flavor |
|---|---|---|---|---|
| Gumbase Suncom-T | 30.00% | 30.00% | 30.00% | 30.00% |
| Lycasin ®85/55 | 10.00% | 10.00% | 10.00% | 10.00% |
| SweetPearl ®P90 | 59.00% | — | 59.00% | — |
| SweetPearl ® P 90/Flavor | — | 60.00% | — | — |

TABLE 1

| | Tested polyols | | | | | | |
|---|---|---|---|---|---|---|---|
| | SWEETPEARL P35 (Maltitol) | SWEETPEARL P90 (Maltitol) | SWEETPEARL P150FD (Maltitol) | NEOSORB P60W (Sorbitol) | NEOSORB P300DC (Sorbitol) | PEARLTITOL 50C (Mannitol 35) | PEARLITOL 160C (Mannitol 60) |
| Process of manufacture | Crystallization | Crystallization | Granulation | Granulation | Spray Drying | Crystallization | Crystallization |
| Mean diameter (laser, μm) | 35 | 90 | 150 | 180 | 300 | 50 | 160 |
| D10 (laser, μm) | 6 | 8 | 20 | 100 | 150 | — | — |
| D90 (laser, μm) | 90 | 140 | 350 | 480 | 460 | — | — |
| Bulk density (g/ml) | 0.43 | 0.5 | 0.67 | 0.67 | 0.53 | 0.55 | 0.66 |
| Tapped density (g/ml) | 0.82 | 0.89 | — | 0.81 | 0.5 | 0.78 | 0.85 |
| Specific surface (m²/g) | 0.3 | 0.35 | 0.8 | 2.05 | 1.45 | 0.46 | 0.25 |

TABLE 3-continued

| | Chewing gum center* formulations: | | | |
|---|---|---|---|---|
| Ingredients | T1 CG center with SP90 | T2 CG center with SP90/ Flavor | T3 CG center with SP150FD | T4 CG center with SP150FD/ Flavor |
| SweetPearl ® P 150FD/Flavor | — | — | — | 60.00% |
| Flavor mint/ vanilla | 1.00% | — | 1.00% | — |
| Total | 100.00% | 100.00% | 100.00% | 100.00% |

*Chewing gum center ("CG center") means the inside of the chewing gum tablets, i.e. without coating.

Processing

In a powder flavor mixing-wet granulator:
  maltitol powder was introduced into the bowl of said wet granulator;
  the premix was stirred at a speed of 300 rpm for 30 sec;
  then a flavor was added dropwise to the bowl with a stirring speed of 300 rpm and a shearing speed of 800 rpm, until the entire flavor was added; and
  continue to mix at a stirring speed of 300 rpm and shearing speed of 800 rpm for 60 sec Loading procedure (min)—Z blade kneader at 60° C.
  For trial "T1" and "T3"—without premix:
    At t=0 min: half of the maltitol powder and the melted gum base were introduced (stoven at 50° C.);
    At t=2 min: all of the LYCASIN® 85/55 (i.e. hydrogenated glucose syrup (hydrolysed starch)) was added;
    At t=4 min: half of the maltitol powder was added;
    At t=6 min: the liquid flavor was added; and
    At t=7 min: the kneader was unloaded.
  For trials "T2" & "T4"—with premix
    At t=0 min: half of the maltitol/flavor powder and the melted gum base were introduced (stoven at 50° C.);
    At t=3 min: all of the LYCASIN® 85/55 (i.e. hydrogenated glucose syrup (hydrolysed starch)) was added;
    At t=6 min: half of the maltitol/flavor powder was added; and
    At t=9 min: the kneader was unloaded.

Rolling & Conditioning
  The gum was strip-dusted with mannitol and this strip of not-fully-separated-tablet-centers was stored at around 15° C., 50% R.H. (Room Humidity) for 24 h.

Sensory evaluation
  A ranking sensory test was made: The samples were presented to panelists, who were asked to place the samples in a rank order (flavor from strong to weak).
  6 people joined the tasting session. These people were not specially trained.

3. Results and Analysis

Sensory evaluation
  The results of sensory evaluation were the following: T4>T3>T2>T1. Thus sample T4 obtained the highest score.

Example 2

Flavor Release Impact by Polyols (P60W, P300DC, SP90 and SP150FD)

1. Aim

The aim was to compare the effect on the flavor release of the nature of the polyol powder (P60W, P300DC, SP90 and SP150FD) and of the way of addition of the flavoring agent (with or without premix).

2. Recipe and Processing Method

Formulation

TABLE 4

| | Polyols/flavor powder | | | |
|---|---|---|---|---|
| Ingredients | R1 P60W/ Flavor | R2 P300DC/ Flavor | R3 SP90/ Flavor | R4 P150FD/ Flavor |
| Neosorb ® P60W | 981.3 g | — | — | — |
| Neosorb ® P300DC | — | 981.3 g | — | — |
| SweetPearl ® P90 | — | — | 983.00 g | — |
| SweetPearl ® P150FD | — | — | — | 983.00 g |
| Flavor mint/ vanilla | 18.7 g | 18.7 g | 17.00 g | 17.00 g |
| Total | 1000.00 g | 1000.00 g | 1000.00 g | 1000.00 g |

TABLE 5

| | Chewing gum center formulations: | | | | | | | |
|---|---|---|---|---|---|---|---|---|
| Ingredients | T1 CG center with P60W | T2 CG center with P60W/Flavor | T3 CG center with P300DC | T4 CG center with P300DC/ Flavor | T5 CG center with SP90 | T6 CG center with SP90/ Flavor | T7 CG center with SP150FD | T8 CG center with SP150FD/ Flavor |
| Gumbase Suncom-T | 30.00% | 30.00% | 30.00% | 30.00% | 30.00% | 30.00% | 30.00% | 30.00% |
| Lycasin ® 85/55 | 10.00% | 10.00% | 10.00% | 10.00% | 10.00% | 10.00% | 10.00% | 10.00% |
| Neosorb P60W | 52.50% | — | — | — | — | — | — | — |
| Neosorb P60W/ Flavor | — | 53.50% | — | — | — | — | — | — |

TABLE 5-continued

Chewing gum center formulations:

| Ingredients | T1 CG center with P60W | T2 CG center with P60W/Flavor | T3 CG center with P300DC | T4 CG center with P300DC/Flavor | T5 CG center with SP90 | T6 CG center with SP90/Flavor | T7 CG center with SP150FD | T8 CG center with SP150FD/Flavor |
|---|---|---|---|---|---|---|---|---|
| Neosorb P300DC | — | — | 52.50% | — | — | — | — | — |
| Neosorb P300DC/Flavor | — | — | — | 53.50% | — | — | — | — |
| Sweetpearl P90 | — | — | — | — | 59.00% | — | — | — |
| SweetPearl P90/Flavor | — | — | — | — | — | 60.00% | — | — |
| SweetPearl P150FD | — | — | — | — | — | — | 59.00% | — |
| SweetPearl P150FD/Flavor | — | — | — | — | — | — | — | 60.00% |
| Mannitol 60 | 5.00% | 5.00% | 5.00% | 5.00% | — | — | — | — |
| Glycerin | 1.00% | 1.00% | 1.00% | 1.00% | — | — | — | — |
| Aspartame | 0.50% | 0.50% | 0.50% | 0.50% | — | — | — | — |
| Flavor mint/vanilla | 1.00% | — | 1.00% | — | 1.00% | — | 1.00% | — |
| Total (%) | 100.00 | 100.00 | 100.00 | 100.00 | 100.00 | 100.00 | 100.00 | 100.00 |

Processing
  In a powder flavor mixing-wet granulator
    polyols powder was introduced into the bowl of said wet granulator;
    the premix was stirred at a speed of 300 rpm for 30 sec;
    then a flavor was added dropwise to the bowl with a stirring speed of 300 rpm and a shearing speed of 800 rpm, until the entire flavor was added; and
    continue to mix at a stirring speed of 300 rpm and shearing speed of 800 rpm for 60 sec
  Loading Procedure (min)—Z blade kneader at 60° C.
    For trials T1, T3, T5 & T7
      t=0 min: half of the polyols powder and the melted gum base were introduced (stoven at 50° C.)
      t=2 min: all of the LYCASIN® 85/55 (i.e. hydrogenated glucose syrup (hydrolysed starch)) was added;
      t=4 min: the rest of the powder was added;
      t=6 min: the liquid flavor was added; and
      t=7 min: the kneader was unloaded.
    In T1 and T3, mannitol was used in addition to sorbitol. Mannitol was added because the composition with only sorbitol was too sticky. In other words in T1 and T3 the polyols powder is constituted of a mixture of sorbitol and mannitol.
    For trials T2, T4, T6 & T8
      0 min: half of the polyols powder and the melted gum base were introduced (stoven at 50° C.);
      3 min: all of the LYCASIN® 85/55 (i.e. hydrogenated glucose syrup (hydrolysed starch)) was added;
      6 min: half of the polyols/flavor powder was added;
      9 min: the kneader was unloaded.
    In T2 and T4 mannitol was used in addition to the premix constituted of sorbitol and flavor agents because the composition with only the premix constituted of sorbitol and flavor agents was too sticky. In other words in T2 and T4 the polyols powder is constituted of a mixture of mannitol and the premix constituted of sorbitol and flavoring agents (premix sorbitol+flavoring agents).
  Rolling & Conditioning
    The gum was strip-dusted with mannitol and this strip of not-fully-separated-tablet-centers was stored at around 15° C., 50% R.H. (Room Humidity) for 24 h.
  Sensory evaluation
    A ranking sensory test was made: The panelists were asked to place the samples in a rank order (flavor from strong to weak).
    7 people join maltitol tasting session; 8 people join sorbitol session. These people were not specially trained.
  3. Results
  Sorbitol
    There was no difference perceived by the panelists between the chewing gums obtained by the two types of processes (without or with premix) whatever the sorbitol. In other words, with the premix of sorbitol (either P60w or P300DC) and flavor, no improvement on flavor release was perceived by the panelists.
    It has to be noted that for these recipes mannitol was added because the composition was too sticky.
  Maltitol
    For SP 90: there was no difference perceived by the panelists between the chewing gums obtained by the two types of processes (without or with premix).
    On the contrary the test with the premix with SP150FD (i.e granulated maltitol with a surface specific area of 0.80 m$^2$/g) obtained the highest score.

Example 3

Flavor Release Impact by Polyols (P60W, P300DC, SP35 and SP150FD)

1. Aim

The aim was to compare the effect on the flavor release of the nature of the polyol powder (P60W, P300DC, SP35 and SP150FD) and of the way of addition of the flavoring agent (with or without premix).

2. Formulation and Processing Method

Formulation

TABLE 6

| SweetPearl 150 FD/flavor powder | |
|---|---|
| Ingredients | SP150FD/Flavor |
| Maltitol | 983.00 g |
| Flavor mint/vanilla | 17.00 g |
| Total | 1000.00 g |

TABLE 7

| Chewing gum center formulations | | | | | |
|---|---|---|---|---|---|
| Ingredients | T1 CG center with P60W | T2 CG center with P300DC | T3 CG center with SP35 | T4 CG center with SP150FD | T5 CG center with SP150FD/flavor |
| Gumbase Suncom-T | 30.00% | 30.00% | 30.00% | 30.00% | 30.00% |
| Lycasin ®85/55 | 10.00% | 10.00% | 10.00% | 10.00% | 10.00% |
| Neosorb ®P60W | 52.50% | — | — | — | — |
| Neosorb ®P300DC | — | 52.50% | — | — | — |
| SweetPearl ®P35 | — | — | 59.00% | — | — |
| SweetPearl ®P150FD | — | — | — | 59.00% | — |
| SweetPearl ®P150FD/Flavor | — | — | — | — | 60.00% |
| Mannitol 35 | 5.00% | 5.00% | — | — | — |
| Glycerin | 1.00% | 1.00% | — | — | — |
| Aspartame | 0.50% | 0.50% | — | — | — |
| Flavor mint/vanilla | 1.00% | 1.00% | 1.00% | 1.00% | — |
| Total | 100.00% | 100.00% | 100.00% | 100.00% | 100.00% |

Processing

Powder flavor mixing-Wet granulator
- polyols powder was introduced into the bowl of said wet granulator;
- the premix was stirred at a speed of 300 rpm for 30 sec;
- then a flavor was added dropwise to the bowl with a stirring speed of 300 rpm and a shearing speed of 800 rpm, until the entire flavor was added; and
- continue to mix at a stirring speed of 300 rpm and shearing speed of 800 rpm for 60 sec Loading Procedure (min)—Z blade kneader at 60° C.

For trials T1, T2, T3 & T4
- At t=0 min: half of the polyols powder and the melted gum base were introduced (stoven at 50° C.);
- At t=2 min: all of the LYCASIN® 85/55 (i.e. hydrogenated glucose syrup (hydrolysed starch)) was added;
- At t=4 min: half of the powder was added;
- At t=6 min: the liquid flavor was added; and
- At t=7 min: the kneader was unloaded.

In T1 and T2, mannitol was used in addition to sorbitol. Mannitol was added because the composition with only sorbitol was too sticky. In other words in T1 and T2 the polyols powder is constituted of a mixture of sorbitol and mannitol.

For trial T5
- At t=0 min: half of the polyols/flavor powder and the melted gum base were introduced (stoven at 50° C.);
- At t=3 min: all of the LYCASIN® 85/55 (i.e. hydrogenated glucose syrup (hydrolysed starch)) was added;
- At t=6 min: half of the polyols/flavor powder was added;
- At t=9 min: the kneader was unloaded.

Rolling & Conditioning

The gum was strip-dusted with mannitol and this strip of not-fully-separated-tablet-centers was stored at around 15° C., 50% R.H. (Room Humidity) for 24 h.

Sensory evaluation

3. Results and Analysis

Sensory evaluation

P60W vs. P300DC—Both without premix 2 chewing gums performed closely, no significant difference was detected.

1. SP35 vs. SP150FD—Both without premix 2 chewing gums performed closely, no significant difference was detected.

SP150FD vs. Flavor SP150FD (i.e with or without premix)

The intensity of the chewing-gum prepared with the Flavored SP150FD (premix SP150 FD+flavoring agent) was perceived globally higher.

The invention claimed is:

1. A chewing gum composition comprising:
   a chewing gum base;
   at least one polyol powder comprising maltitol, a specific surface area of the polyol powder being in a range of 0.55 to 0.95 m$^2$/g; and
   at least one water insoluble flavoring agent,
   wherein the at least one water insoluble flavoring agent is adsorbed on the polyol powder,
   an amount of the at least one water insoluble flavoring agent is between 0.05 and 6% by weight in comparison to a total weight of the chewing gum composition, and
   the polyol powder comprising maltitol is a granulate.

2. The chewing gum according to claim 1, wherein a proportion of the at least one polyol powder comprising maltitol is between 25 and 75% by weight in comparison to the total weight of the chewing gum composition.

3. The chewing gum according to claim 2, wherein the at least one polyol powder comprising maltitol has a mean particle diameter between 100 and 1000 μm.

4. The chewing gum according to claim 1, wherein the polyol powder comprising maltitol was obtained by wet granulation.

5. The chewing gum according to claim 1, wherein the polyol powder consists of maltitol.

\* \* \* \* \*